United States Patent [19]

Mino et al.

[11] Patent Number: 4,867,070
[45] Date of Patent: Sep. 19, 1989

[54] LINEAR MOTOR TYPE MONORAIL CONVEYING APPARATUS

[75] Inventors: Joji Mino, Himeji; Takashi Ishikura, Hyogo, both of Japan

[73] Assignee: Tsubakimoto Chain Co., Osaka, Japan

[21] Appl. No.: 202,951

[22] Filed: Jun. 6, 1988

[30] Foreign Application Priority Data

Jun. 15, 1987 [JP] Japan ................ 62-90715

[51] Int. Cl.⁴ .............. B60L 13/02; B60L 13/10
[52] U.S. Cl. ................................. 104/293; 104/282
[58] Field of Search ............ 104/119, 118, 290, 291, 104/293, 294, 281, 282

[56] References Cited

U.S. PATENT DOCUMENTS

| | | | |
|---|---|---|---|
| 3,092,040 | 6/1963 | Bingham | 104/119 X |
| 4,742,778 | 5/1988 | Morishita et al. | 104/291 X |

FOREIGN PATENT DOCUMENTS

| | | | |
|---|---|---|---|
| 2541599 | 3/1977 | Fed. Rep. of Germany | 104/282 |
| 132577 | 10/1978 | German Democratic Rep. | 104/118 |
| 893646 | 12/1981 | U.S.S.R. | 104/293 |

Primary Examiner—Johnny D. Cherry
Assistant Examiner—Gary C. Hoge
Attorney, Agent, or Firm—Ferrill & Logan

[57] ABSTRACT

A linear motor type monorail conveying apparatus is disclosed including a pair of carriers adapted to ride on the monorail and a load bar positioned beneath the monorail connection the pair of carriers. A linear induction motor is carried by the load bar with the secondary member of the linear motor mounted on the lower surface of the monorail structure and the primary member formed as an integral part of the linear motor and spaced slightly beneath and parallel to the secondary member.

4 Claims, 4 Drawing Sheets

LINEAR MOTOR TYPE MONORAIL CONVEYING APPARATUS

FIELD OF THE INVENTION

The present invention relates to a monorail type conveying apparatus which is driven by a linear motor.

BACKGROUND OF THE INVENTION

A monorail type conveying apparatus is advantageous, being capable of making effective use of space; however, it has been conventionally driven by a rotary type motor.

Typically, such a conveying apparatus comprises, as shown in U.S. Pat. No. 4,480,157, a pair of carriers each having a support wheel adapted to roll on the monorail and a plurality of guide rollers adapted to engage both sides of the monorail at the upper and lower portions of the monorail, and at the front and rear positions of the conveying apparatus. A load bar interconnects the carriers beneath the monorail, and electric current feeding rails are disposed along one side of the monorail engaged by collectors provided on one of the carriers.

However, with a rotary type motor used as a driving source, the conventional monorail apparatus has a drawback that it requires a complicated transmission mechanism as well as a speed reducing mechanism with a resulting heavy weight.

Consequently, use of a linear induction motor (hereinafter referred to simply as "linear motor") has recently been proposed because of its large starting propulsive force, acceleration/deceleration (braking) and capability of doing away with a transmission mechanism as well as speed reducing mechanism.

With linear motors, it has been conventional to install a secondary conductor (non-energized member) on the upper surface or side face of a monorail; and the primary conductor member (power feed member) installed in a position opposing the secondary conductor.

It is to be noted, however, that a linear motor has a characteristic that it generates not only a propulsive force but an attracting force between the primary and the secondary members. Thus, if a secondary conductor is provided on the upper surface of the monorail, attracting force is applied to the running wheels of the conveying apparatus, increasing the force of the conveying apparatus on the monorail with a resultant increase in rolling friction. Consequently, a smooth running of the wheels is impeded, thereby obstructing an accurate control of operation of the monorail conveying apparatus.

One way to solve this problem is, of course, to increase the driving force of the linear motor. However, the weight of a linear motor increases in proportion to its propulsion force, which thereby increases the rolling friction.

Therefore, it has been conventional to set the propulsion force of the linear motor seeking a compromise between the amount of the rolling friction and the total weight of the conveying apparatus.

In addition, it has been a problem that as a secondary conductor, an aluminum plate lined with an iron plate is required, since the monorail structure is usually made of concrete.

SUMMARY OF THE INVENTION

The present invention is a linear motor type monorail conveying apparatus comprising a pair of carriers each having a running wheel adapted to roll on a monorail and guide rollers adapted to engage both sides of the monorail at the upper and lower, and front and rear positions, respectively, of the conveying apparatus. A load bar interconnects the carriers beneath the monorail, and current feeding rails at one side of the monorail are engaged by collectors on at least one of said carriers. Further, the load bar is provided with a front and rear rollers for securing a clearance between a primary member of a linear induction motor carried by the load bar and a secondary member of the linear induction motor provided on the lower surface of the monorail.

According to the present invention, a linear motor is provided between the lower surface of a monorail and a load bar; and consequently, the weight of the monorail type conveying apparatus may be reduced, as the linear motor will pull the conveying apparatus upward toward the monorail due to the attracting force generated by the linear motor.

PREFERRED EMBODIMENT OF THE PRESENT INVENTION

Figure 1:
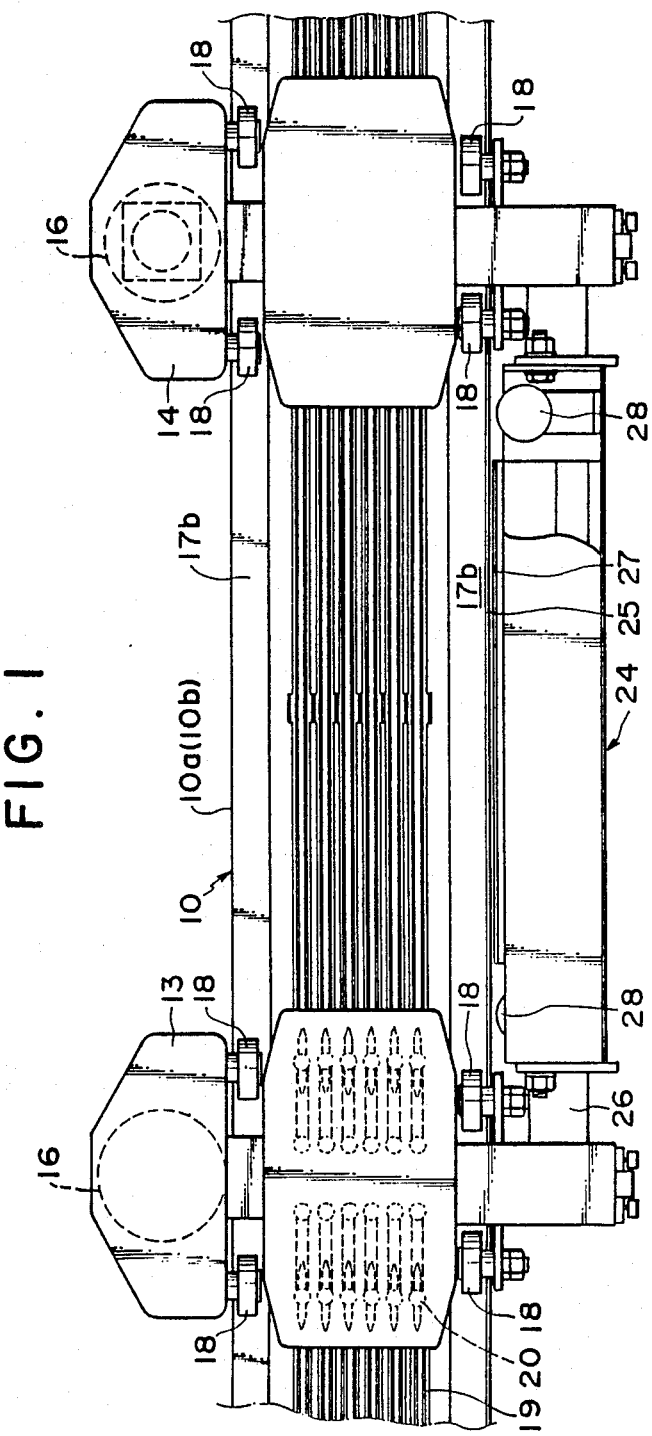
FIG. 1 is a front view of the apparatus according to the invention.
Figure 2:
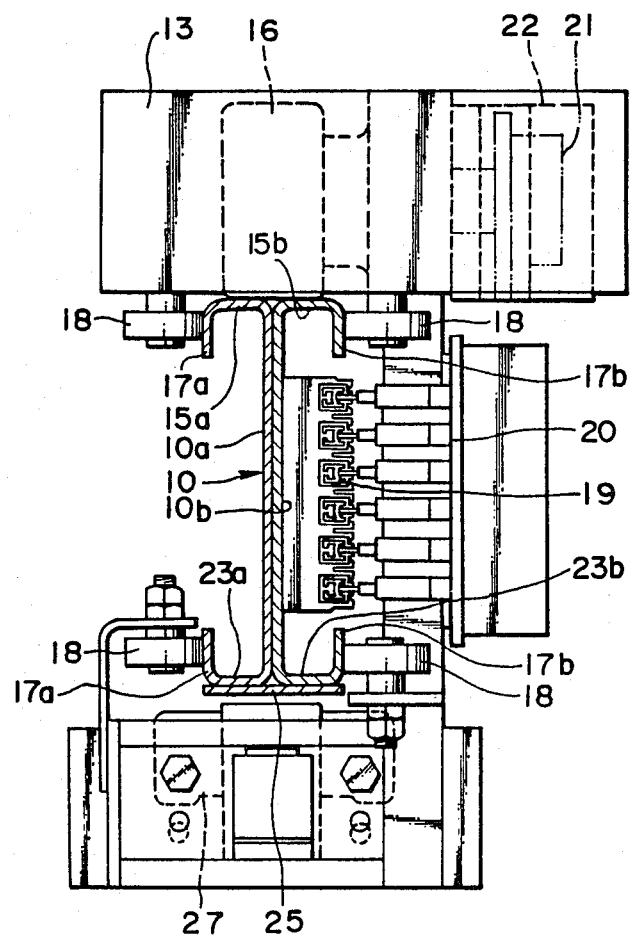
FIG. 2 is an enlarged left-side view.
Figure 3:
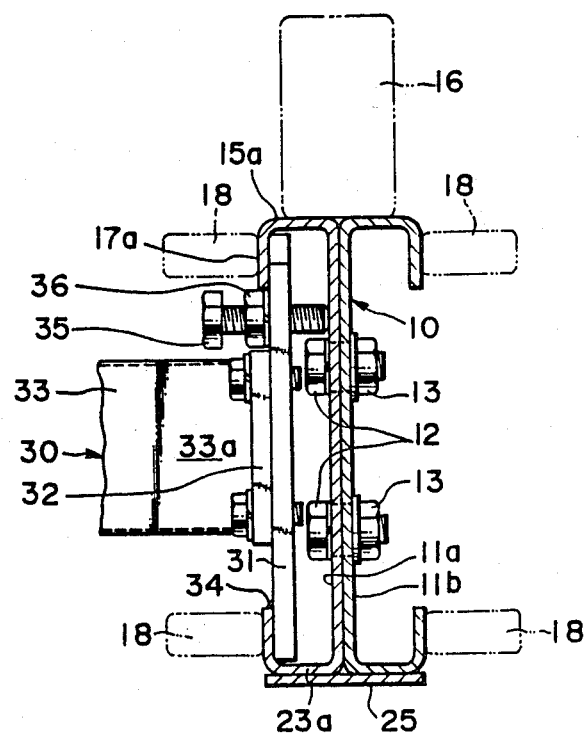
FIG. 3 is a cross-section showing the support mechanism of the monorail.

A monorail 10 comprises a pair of steel plates 10a, 10b. Each plate is, as shown in FIGS. 2 and 3, generally C-shaped in cross section having two horizontal portions and one vertical portion as well as two outer vertical segments. The central webs 11a and 11b are connected in back-to-back relationship by means of bolts 12 and nuts 12a.

A pair of carriers 13, 14 are adapted to run on the monorail 10. In particular, a running wheel 16 rolls on the upper horizontal portions 15a, 15b; and guide rollers 18 (each carrier preferably has 8 guide rollers) are adapted to engage the sides of the outer segments of the portions 17a, 17b.

In the illustrated embodiment of the present invention, collectors 20 are provided on the carrier 13 so as to make sliding contact with feeding rails 19 mounted to the side of the web 11b of the monorail 10. At least one of the carriers 13 and 14 is provided with a non-magnetizably operable brake in the upper side thereof; and either one of the carriers (carrier 13 is in the illustrated embodiment) has a speed sensor 22 in case a feed back control of the running speed is required.

On the lower surface of the lower horizontal portions 23a, 23b of the monorail 10, a secondary conductive member 24 of the linear motor is attached, which is a non-energized member.

In addition, beneath the monorail 10, the two carriers 13, 14 are interconnected by a load bar 26, on which a primary (energized) member 27 of the linear motor is provided. A typical structure of a linear motor is well-known and a detailed explanation thereof is not required. It is to be noted that front and rear rollers 28 are supported on the load bar 26 to secure the requisite clearance between the primary and secondary members, 27 and 24 respectively, of the linear motor.

The above-mentioned monorail 10 may be made of iron or steel; and the secondary member 24 of the linear motor 24 may preferably be made of aluminum or copper which has good electric conductivity.

Figure 4:
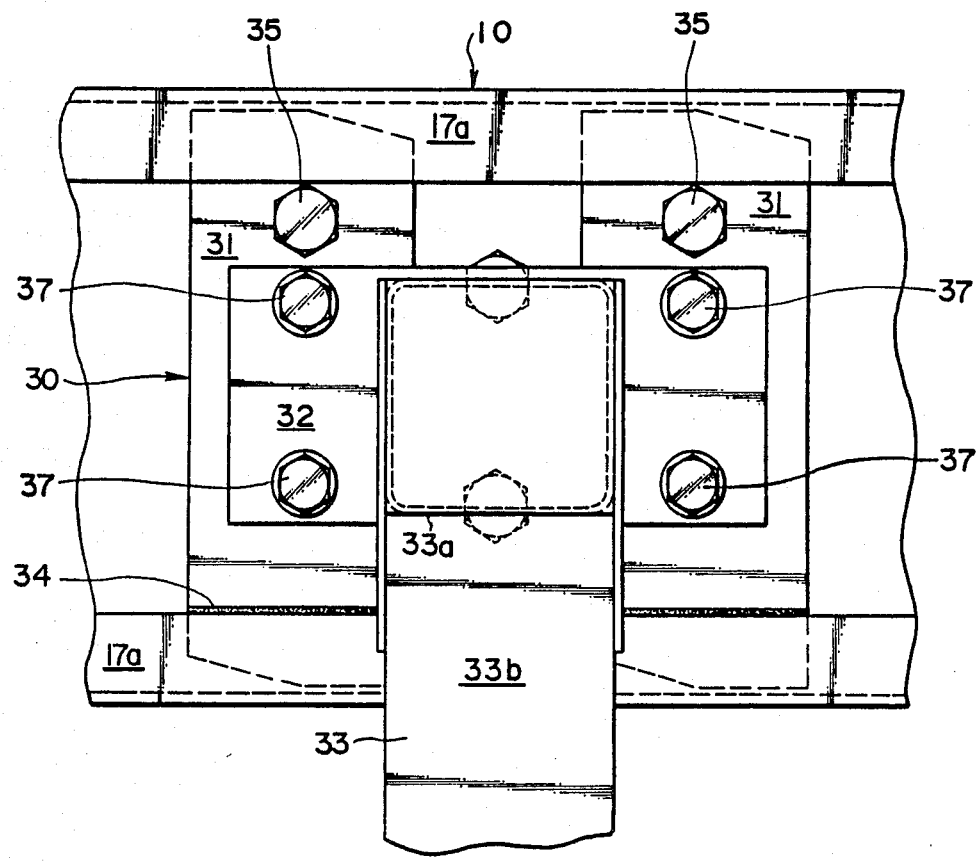
FIG. 4 is a left-side view of FIG. 3.

The above-mentioned monorail 10 is mounted, for example, to the ceiling by means of a support mechanism 30 as shown in FIGS. 3 and 4, which comprises support leg plates 31, a bracket 32 and support legs 33.

The support leg plate 31 is located between the upper horizontal portion 15a and the lower horizontal portion 23a; and it is welded to the lower upright portion 17a as shown by the reference numeral 34, and makes a pressure contact with the inside of the upper down-facing portion 17a by means of bolts 35 and nuts 36, thereby being secured to the monorail 10.

Both ends of the bracket 32 are secured to the support leg plate 31 by means of bolts 37.

The cross section of the support leg 33 is rectangular and comprises a horizontal member 33a mounted to said bracket 32 and a vertical member 33b.

When power is supplied to the primary member 27 of the linear motor 24 through the collectors 20 in contact with the electric current feeding rails 19, a propelling force is generated between the secondary member 25 and the primary member 27 due to the electro-magnetic action; and consequently, the conveying apparatus will run on the monorail 10.

Specifically, the running wheel 16 rolls on the upper, intermediate, horizontal portions 15a, 15b; and the guide rollers 16 engage the sides of the bent portions 17a, 17b.

As the propelling force is generated, the primary member 27 tends to be attracted toward the secondary conductive member, which serves to lift the whole conveying apparatus upward. Even is such force applies, a predetermined clearance may be maintained between the primary member and the secondary member by means of the front and rear rollers 28, 28.

According to the above-mentioned embodiment, the linear motor 24 is arranged between the lower surface of the monorail 10 and the load bar 26. Hence, the whole conveying apparatus is lifted upward due to the attracting force generated by the operation of the linear motor, which serves to reduce the weight of the conveying apparatus acting upon the running wheels 16, 16, thus reducing the rolling friction. This results in conveying apparatus running smoothly with less friction, and facilitating control of running and stopping the carriers with accuracy.

Moreover, by fixing the secondary member 25 made of aluminum or copper to the lower surface of the monorail 10, a larger amount of magnetic flux may be generated from the primary member resulting in greater propulsion force. Use of aluminum, copper or other highly conductive material is advantageous in that it is light and the price is reasonable.

It is to be noted that it is not essential for the present invention to employ the monorail illustrated herein; a conventional I-shaped monorail may also be utilized.

While a particular embodiment of the present invention is illustrated and embodied herein, it is not intended to limit the invention to such a disclosure, but changes and modifications may be incorporated therein within the scope of the following claims.

What is claimed is:

1. In a linear induction motor type conveying apparatus comprising a pair of carriers each having a running wheel adapted to roll on the upper surface of a monorail and a plurality of guide rollers adapted to engage both sides of the monorail at the upper and lower surfaces, and front and rear positions, respectively, of the conveying apparatus, a load bar interconnecting said carriers beneath the monorail, feeding rails provided at the side of the monorail, and collectors provided on at least one of said carriers;

said linear motor including a primary member formed as an integral part of the linear motor and a secondary member mounted on the lower surface of the monorail, means supporting said linear motor on said load bar with the primary member thereof spaced parallel to and beneath said secondary member, said primary member providing an attractive magnetic force on said secondary member when said linear motor is activated which provides an upward force on said conveying apparatus thereby minimizing the rolling friction of said conveying apparatus; and front and rear rollers carried by said load bar projecting upwardly above said primary member to maintain clearance between said primary and secondary members of the linear induction motor.

2. The apparatus according to claim 1 wherein said monorail comprises a pair of back-to-back arranged component rails, each component rail having a generally C-shaped cross section with a central upright web portion, two intermediate horizontal portions and two end portions bent at a right angle.

3. The apparatus according to claim 2 wherein the monorail is made of iron and said secondary member is made of a highly conductive material.

4. The apparatus of claim 3 wherein said secondary member is selected from the class of aluminum and copper.

* * * * *